United States Patent [19]
Kirley

[11] 3,833,929
[45] Sept. 3, 1974

[54] POSITIVE IDENTIFICATION CREDIT OR ID CARD AND APPARATUS

[76] Inventor: Joseph F. Kirley, 27 Fairfield Ave., Norwalk, Conn. 06854

[22] Filed: Oct. 17, 1972

[21] Appl. No.: 298,403

[52] U.S. Cl. .................... 340/149 A, 340/149 R
[51] Int. Cl. .............................................. H04q 1/00
[58] Field of Search ................ 340/149 A; 200/46 R

[56] References Cited
UNITED STATES PATENTS

| | | | |
|---|---|---|---|
| 3,215,903 | 11/1965 | Barney | 200/46 R |
| 3,403,380 | 9/1968 | Welch | 200/46 X |
| 3,504,343 | 3/1970 | Ditlow | 340/149 A |
| 3,593,292 | 7/1971 | Scott | 340/149 A |
| 3,624,938 | 12/1971 | Richard | 200/46 X |

*Primary Examiner*—Harold I. Pitts
*Attorney, Agent, or Firm*—Alfred E. Miller

[57] ABSTRACT

A credit card positive identification arrangement having a machine incorporated with a standard type credit card charge slip information imprinting device and providing a visual read out of the acceptability or non-acceptability of the credit or ID card to be validated. The device utilizes a combination of a plurality of rotatable secret bridging wiper contacts to change the electrical circuit in the card from an open circuit to a closed circuit and thereby signal an acceptable card. An electronic positive identification arrangement is also contemplated in which an electronic control circuit, being activated by the proper secret digital combination, will operate a servo motor to rotate the respective indicators to their proper settings. Another type of positive identification arrangement is shown utilizing magnet attraction between a disc magnet and a printed circuit in the card to set the proper combination and thereby close the electrical circuit in the card.

13 Claims, 12 Drawing Figures

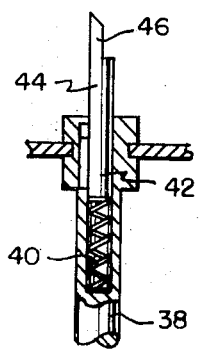
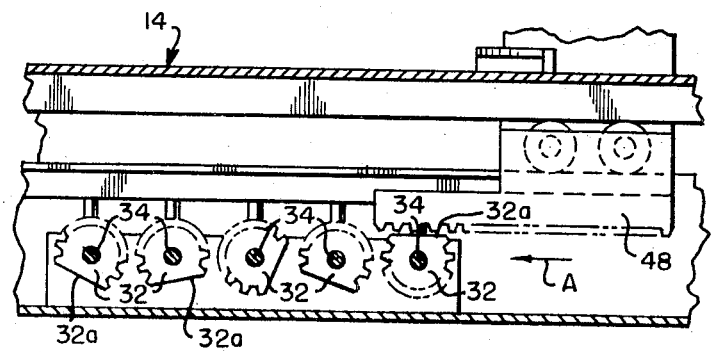
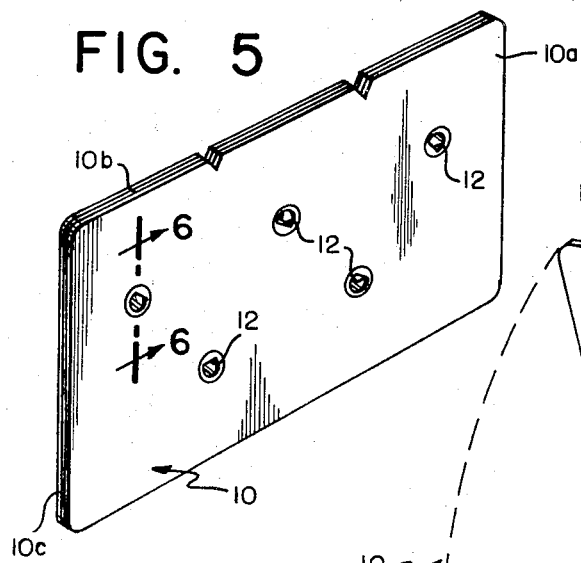
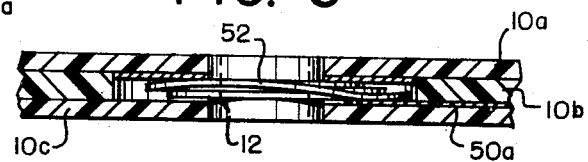
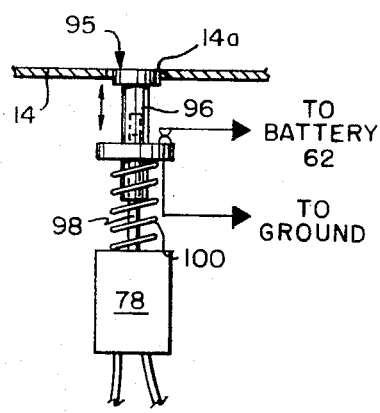
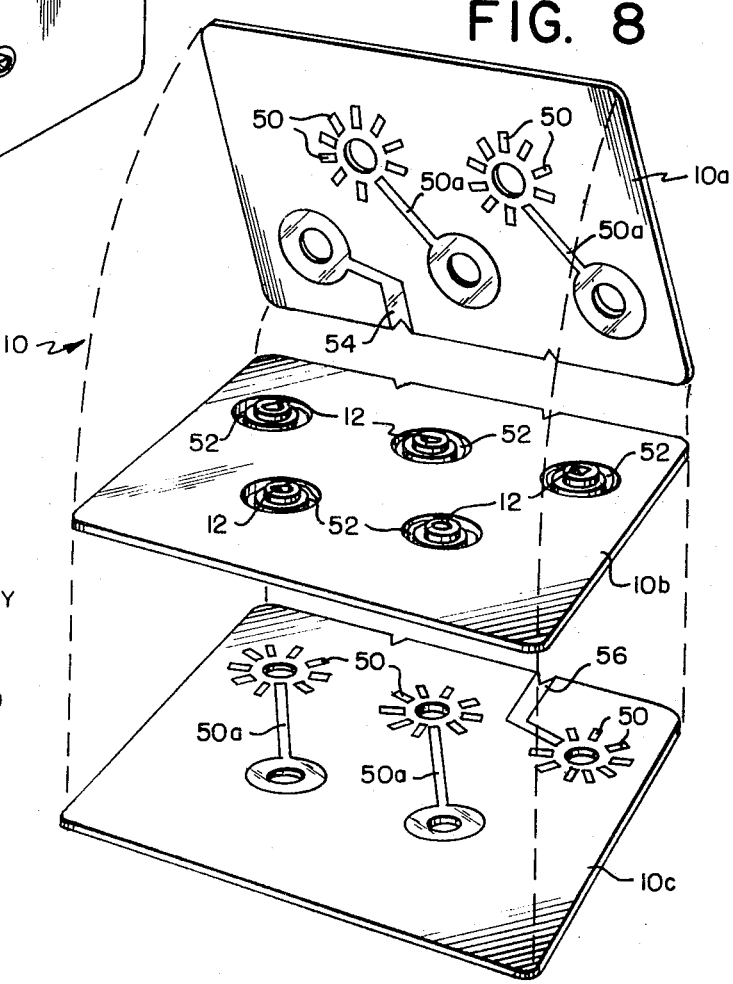

POSITIVE IDENTIFICATION CREDIT OR ID CARD AND APPARATUS

BACKGROUND OF THE INVENTION

The invention relates to a credit card arrangement incorporating secret settable bridging wiper contacts for an internal electrical circuit in the card and a combination portable visual indicator machine for a modified standard type of credit card charge slip information imprinting device.

Much publicity has been devoted to the enormous amount of credit card thefts and losses occuring each year. Consequently, credit card companies, as well as insurance carriers, have been subject to losses of many millions of dollars.

Many devices and schemes have been proposed in order to effectively authenticate each credit card that is presented to merchants for charging goods or services. However, each of these devices and schemes appears to have drawbacks which do not make them entirely satisfactory for the purposes intended.

It is therefore an object of the present invention to provide a credit card secret combination for closing an electrical circuit and validating the credit card presented for verification.

It it another object of the present invention to provide a positive bridging wiper contact arrangement within the credit card that is reliable even after a great number of repeated uses.

A further object of the present invention is to provide a neutralizing or scramble assembly for the rotating bridging wiper contacts after authentication of the credit card.

An object of the present invention is to provide a combination portable indicating machine and a modified standard type credit card charge slip information imprinting device which has an instant visual read out of the acceptability of the credit card.

Another object of the present invention is to provide an electronic positive identification arrangement for credit or ID cards which activates a servo motor and is provided with an electronic scramble circuit which is operative after authentication.

A further object of the present invention is the provision of a magnetic arrangement within the credit card which, when properly arranged according to a secret combination, will complete an electrical circuit and thereby validate the card.

Another object of the present invention is to provide a plurality of false wiper contacts together with the correct bridging wiper contacts so that the proper combination setting cannot be either heard or felt by unauthorized persons.

An object of the present invention is to provide visual read out by means of a portable console having indicator lights which signal either "acceptable", or "rejection", and also an audible alarm for a "Short circuit".

The invention will now be more fully described with reference to the accompanying drawings wherein:

FIG. 3 is an enlarged sectional view of the keyed tip shaft which is adapted to project through corresponding keyed openings in the credit card.

FIG. 4 is a partial section and partial elevational view showing the rack and gear segments utilized in the scramble arrangement in the machine.

FIG. 5 is a perspective view of the credit or ID card construction in accordance with the teachings of the present invention.

FIG. 6 is a view taken along the lines 6—6 of FIG. 5.

FIG. 8 is an exploded perspective view of the three layers and associated elements thereon constituting the laminated credit or ID card of the present invention.

FIG. 12 is a diagrammatic view of the reset power switch feature of the invention.

PREFERRED EMBODIMENTS OF THE INVENTION

In accordance with the teachings of the present invention, a specially prepared laminated credit or ID card 10, as seen in FIG. 5, is provided with a multiplicity of spaced, keyed apertures 12 which pass through the three parts 10a, 10b, and 10c of the laminated credit card 10 (FIG. 8).

Figure 1:
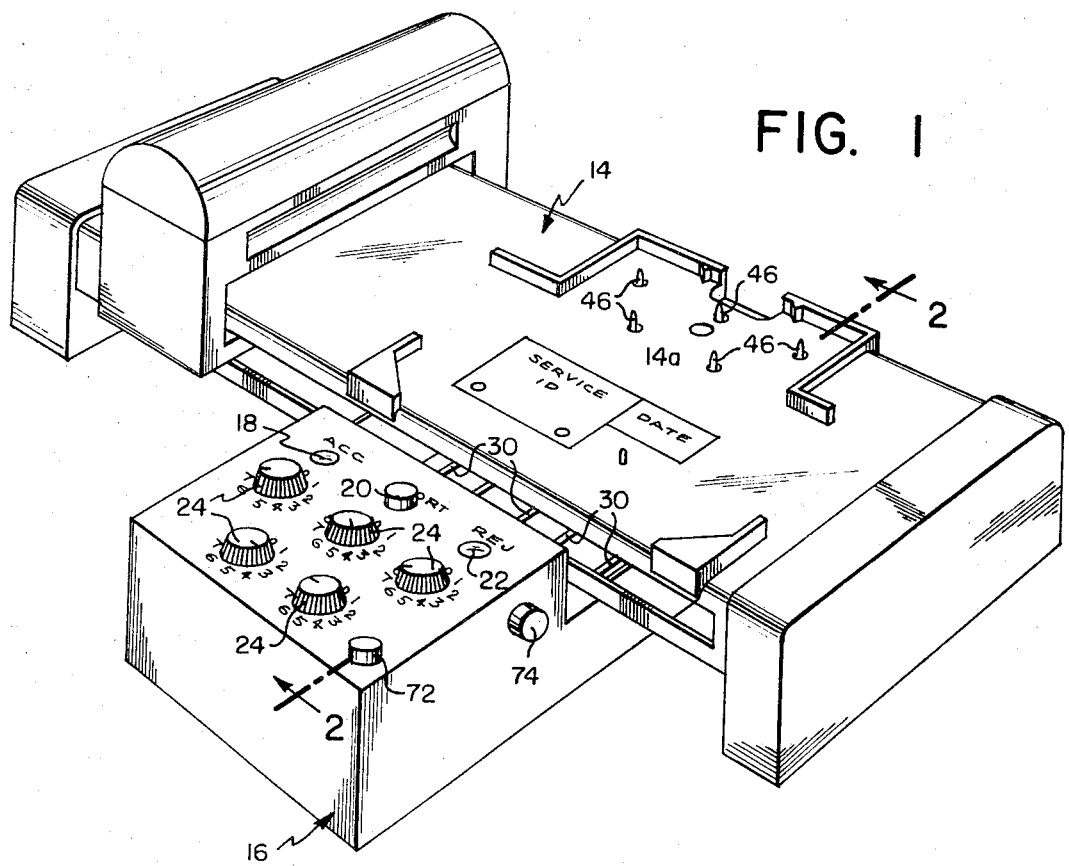
FIG. 1 is a perspective view of the portable dial setting and visual indicator machine according to the teachings of the present invention which is incorporated with a modified standard credit card charge slip information imprinting device.

Referring to FIG. 1, a modified standard type credit card charge slip information imprinting device 14 is shown having a portable console 16 which is incorporated therewith and provides a visual read out by signal light 18 for "acceptable", buzzer 20 for a "short", and signal light 22 for "rejected". The setting knobs 24 on the console 16 are each connected by means of shaft 26 to a bevel gear assembly 28. The latter is fixed to another shaft 30 and neutralizing gear 32. A further shaft 34 connects to another bevel gear assembly 36. The latter has mounted thereon a hollow shaft 38 which contains an helical compression spring 40. The spring engages the spline 42 of keyed tip shaft 44 which is provided with a tapered tip 46 that is adapted to project through corresponding keyed aperture 12.

Figure 2:
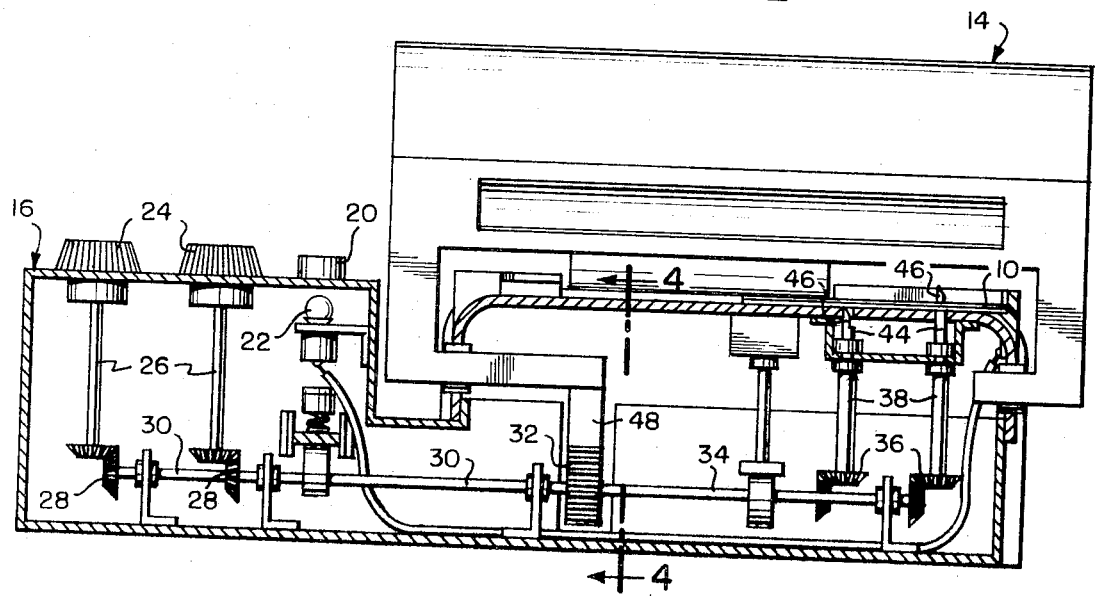
FIG. 2 is a cross sectional view taken along the lines 2—2 of FIG. 1.

As seen in FIG. 2, the right hand tip 46 of the keyed tip shaft 44 is shown projecting through a corresponding aperture 12 in the card 10 while the left hand tip 46 has not projected through the corresponding aperture 12, inasmuch as the proper keying in the aperture has not been achieved.

FIG. 4 discloses the details of the neutralizing assembly in which a rack 48 is shown which is adapted to move in the direction of the arrow A after a credit card 10 has been checked in the apparatus and removed therefrom. The neutralizing gears 32 each have a flattened portion 32a without gear teeth. Thus, the gear teeth of the rack 48 interengage with the teeth of the gears 32 until the latter are rotated to positions in which the flattented portions 32a of the gears are located adjacent to the gear teeth of rack 48. In this position, there is no interengagement of the teeth and the rack 48 will not rotate the particular gear or gears 32. In fact, the linear printing motion of the device 14 will neutralize the gear settings. In this manner, the settings of the gears 32 are randomly neutralized, and unauthorized persons cannot learn the combination of gear settings of the previously checked credit card.

Figure 7:
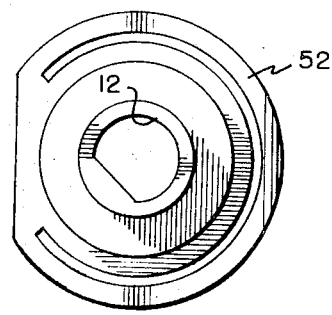
FIG. 7 is an enlarged top plan view of a keyed aperture in the credit or ID card and the adjacent spring steel contact element.

As seen in FIG. 8, the laminated card 10 is provided with a prearranged combination of contacts 50 on both parts 10a and 10c in which only 50a is the actual contact while the other contacts 50 are merely camouflage contacts. Referring now to FIGS. 6 and 7, it will be noted that a spring steel contact 52 makes a circuit connection between the proper contact 50a on the laminated part 10a and the corresponding contact 50a on the laminated part 10c. The contacts 52 are mounted on hubs located in an opening in part 10b of such a size that the contacts do not engage any portions of the part 10b. Thus, each of the five spring steel contacts 52 shown in FIG. 8 makes the prearranged positive bridging contacts by means of the proper setting of each of the knobs 24 on the console 16 thereby establishing a closed electrical circuit. The circuit terminates at 54 and 56 at a marginal edge of the laminated card 10. Accordingly, if the credit card is provided with a closed electrical circuit which is accomplished by the proper setting of the dials 24, the signal light 18 on the console 16 will light to indicate acceptability of the credit card.

Figure 9:
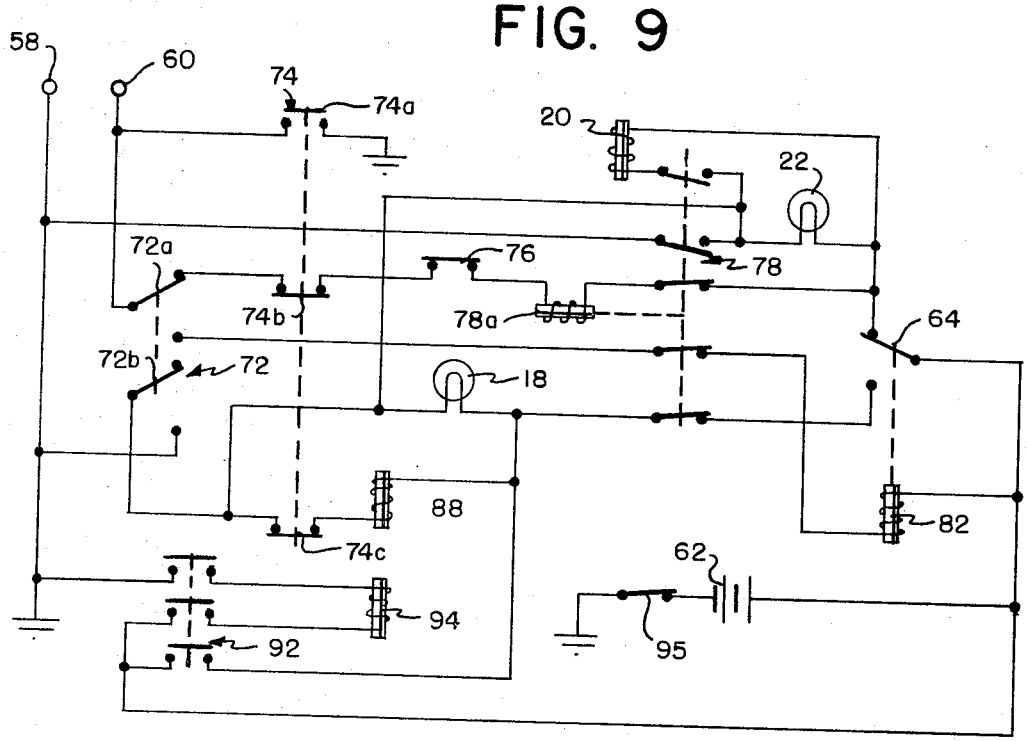
FIG. 9 is a schematic view of the electrical circuit providing the visual read out by the machine for the credit card being authenticated.

FIG. 9 discloses the circuit for the present credit card positive identification arrangement in which all possible conditions of any credit card can be checked. The card terminals 54 and 56 are connected to the circuit terminals 58 and 60, respectively. In order to verify any credit card that is presented for use, the following procedures must be followed:

An attempt may be made by dishonest persons to circumvent the present testing procedure by shorting the card by the use of an extremely thin wire connecting or jumping the card terminals 54 and 56, and thus "shorting" the card. A test for such a short in the credit card requires all of the knobs 24 on the console 16 to be set at zero before the card can be inserted in the machine. If the card is shorted, a circuit is made from the positive side of battery 62 through the magnetic trip switch 78, through 74b the closed portion of the card test switch 72, through the shorted card terminals 60 and 58 to ground, thus tripping the magnetic trip switch. Simultaneously, a circuit is made through the relay switch 64, through the reject lamp 22, through the buzzer 20, and then through ground to return to the negative side of the battery 62. It should be noted that the magnetic trip swtich 78 is a five contact switch of the type in which any current flow through the electromagnet portion 78a of the switch will close certain contacts of the switch and open the other contacts. If the credit card being checked is not shorted, then the circuit is incomplete. In this condition, the connection from the positive side of the battery 62 through the relay switch 64, through the trip switch 78, through the cut out switch 76, through contact 74b of the circuit test switch 74 to the card terminal 63 is open, since there is no complete circuit through the credit card. Thus, in this condition, neither the reject buzzer 20 nor the signal light 22 will activate, indicating that the particular credit card is not shorted.

When a credit card is inserted in the machine and the proper combination is then dialed, through a cam arrangement 27 on the knob shafts, the cut out switch is opened, thus eliminating the possibility of the trip switch being activated when the proper combination is dialed. Then the double pole card test switch 72 is put in the down position and a circuit is made from the positive side of the battery 62 through the relay coil 82 which pulls down the relay switch 64, and hence through the latter and the magnetic trip switch 78, the accept lamp 18; and in a parallel circuit through the unlocking solenoid 88. The latter device is then operative to release the imprinting arm of the credit card imprinting device for the imprinting function. The circuit is finally completed through the ground to the negative side of the battery 62. It should be noted that the test switch 72 cannot be put in the down position until a combination is set by the knobs 24.

It a credit card is inserted in the machine and a wrong combination is dialed, then the circuit from the positive side of the battery 62 passes through the relay switch 64, through the reject lamp 22, and then through ground to the negative side of the battery 62. In another condition with a card having a wrong combination being inserted in the machine, or no card at all, and the card test switch 72 as well as the circuit test switch 74 being depressed, a circuit is made from the positive side of the battery 62 through both the relay switch 82 which pulls down the relay switch 64 causing current to flow through acceptability lamp 18. The circuit is then completed through ground to the negative side of the battery 62. In this condition, the unlocking solenoid 88 is not activated.

In order to test the circuit without unlocking the solenoid 88, the circuit test switch 74 is depressed. Thus, switch contact 74a is closed while switch contacts 74b and 74c are open. The accept lamp 18 has power applied thereto from battery or power supply 62 while the parallel circuit, having unlocking solenoid 88 is open due to the open switch contact 74c.

The last condition to be tested is the situation in which the key operated switch 92 is closed after unlocking by a store manager or other person in authority. When this occurs, a circuit is made from the positive side of the battery 62 through the relay switch 64, the reject lamp 22, the accept lamp 18, the unlocking solenoid 88, and the marking solenoid 94 which makes an imprint on the credit card slip indicating that the normal operation of the credit card imprinting machine has been by passed by the use of a key. The circuit is completed through ground to the negative side of the battery 62.

Another feature of the present arrangement is illustrated in FIG. 12 in which the reset power switch 95 is shown mounted flush in the well 14a of the imprinting device 14. The switch 95 is connected to the trip switch 78 by means of a slidable sleeve 96 and a shaft 98 provided with a return spring 100. Another switch 102 which cuts off electrical power is operatively connected to the sleeve 96. It should be noted that each time after the reset trip switch has been tripped, it must be reset manually. The purpose of the present invention is to prevent a store clerk from jamming the reset feature of the device so that the circuit that tests for a shorted card can be overcome.

Figure 10:
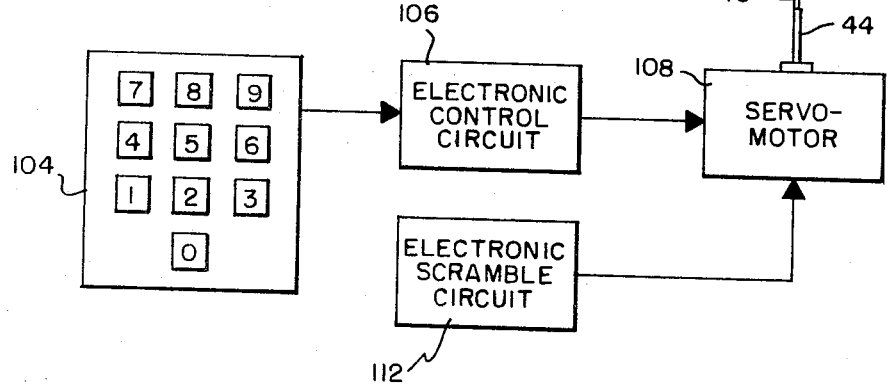
FIG. 10 is an alternate embodiment of the present invention providing electronic circuits for operating a servo motor and an electronic scramble circuit.

FIG. 10 discloses another embodiment of the present invention which has a digital console 104 which feeds into an electronic control circuit 106. The latter in turn activates a servo motor 108 which, in turn, rotates each of the key shafts 44 to the appropriate combination for each credit card. It will be noted that an electronic scramble circuit 110 is also connected to the servo motor 108 in order to reset to zero the knobs 24, after each credit card has been checked.

Figure 11:
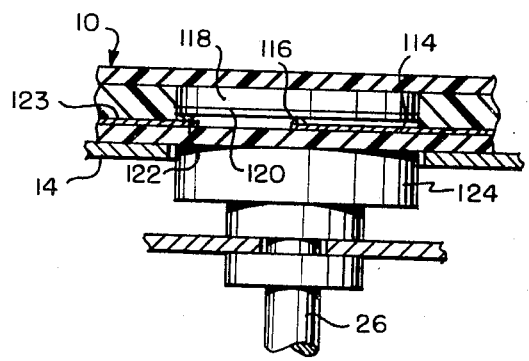
FIG. 11 is another form of the present invention utilizing magnetic attraction for completing an electrical circuit and thereby validating the credit card presented for authentication.

FIG. 11 illustrates a modification of the present arrangement in which a printed circuit 114 is provided with a contact pivot point 116 at one end thereof. The disc shaped magnet 118 has a contact strip 120 which is provided with another contact point 122 that engages another printed circuit 123 upon magnetic attraction. The shaft 26 is connected at one end to the knob 24 (not shown) and at the other end to a permanent magnet 124. When the shaft 26 is rotated to the proper predetermined angular position, the unlike poles of the adjacent magnets 118 and 124 are aligned thereby connecting the two circuits 114 and 123. When all of the printed circuits in the arrangement are connected through magnetic action, the correct combination has been set on the credit card and the same may be validated according to the steps set forth hereinbefore.

What is claimed is:

1. A positive identification credit or ID card for use with verification apparatus having an electrical circuit comprising three insulated parts adapted to be laminated together in a superposed relationship, a plurality of contacts on one outside part, a plurality of corresponding contacts on the opposite outside part, a plurality of rotatable resilient wiping contacts mounted on the intermediate part, an interrupted electrical circuit on both outside parts, and means operatively connected to said rotatable wiping contacts for setting each of the latter according to a predetermined secret combination and interconnecting the contacts on the outside parts of the card to thereby close said electrical circuit and activate an indicator whereby said card may be authenticated by said verification apparatus, said wiping contacts being electrically insulated from said contacts on the outside parts until said secret combination is set.

2. The card as claimed in claim 1 wherein said rotatable resilient wiping contacts are constituted of spring steel and are adapted to simultaneously engage the coresponding contacts on opposite outside parts of said three insulated parts.

3. A combination credit card positive identification machine and standard type credit card charge slip information imprinting device on which a credit card having a hidden normally open electrical circuit is placed, comprising a portable console provided with a plurality of rotatable knobs settable according to a secret combination, means including rotatable wiper contacts, hidden in said card and operatively connected to said knobs for bridging the open portions of said electrical circuit in the credit card being authenticated if the proper setting is established to thereby signal the acceptability of said card.

4. The combination as claimed in claim 3 wherein said card is provided with a plurality of spaced keyed discs, and a plurality of keyed tip shafts which are operatively connected to said knobs, and each of said keyed tip shafts are adapted to project through a corresponding keyed disc to rotate the corresponding wiper contact to a selected position.

5. A machine as claimed in claim 3 further comprising a mechanical arrangement for neutralizing or randomly scrambling said rotatable knobs after the authentication of the credit card is established.

6. A machine as claimed in claim 5 wherein said mechanical arrangement constitutes a rack and co-acting gear segments corresponding to the number of knobs on the machine, and each of said gear segments having portions without gear teeth which are out of engagement with said rack.

7. A machine as claimed in claim 3 having an electrical circuit provided with a visual accept or reject indicator and a locking means which normally locks the printing arm of a standard type credit card charge slip information imprinting device, said locking means being unlocked when said accept indicator is activated.

8. A machine as claimed in claim 7 having an additional electrical circuit provided with a circuit test switch that indicates a properly functioning circuit by activating said accept indicator while said locking means remains locked.

9. A machine as claimed in claim 7 having an additional electrical circuit provided with an audible alarm that is activated to indicate when said card is shorted.

10. A machine as claimed in claim 7 having an additional electrical circuit provided with a key operated switch, said switch being adapted to unlock said locking means when a card is mounted in said credit card charge slip information imprinting device.

11. A machine as claimed in claim 10 further provided with an additional circuit having a printing solenoid whereby said charge is imprinted with a mark indicating that said key operated switch was used to unlock said locking means.

12. A positive identification or ID card for use with verification apparatus having an electrical circuit, comprising a pair of spaced magnets, at least one of which is hidden, each having contacts thereon at predetermined secret locations, said contacts being so arranged that when the proper setting of said magnets is established, the magnetic poles of said spaced magnets are opposite each other to thereby move said contacts into engagement with each other and close said electrical circuit whereby said card may be authenticated by said verification apparatus.

13. The card as claimed in claim 12 wherein at least one of said magnets is a rotatable disc.

* * * * *